March 29, 1932.  F. H. OWENS  1,851,724

COMBINED FRAMING AND DISSOLVING MECHANISM

Filed Oct. 18, 1928

INVENTOR
Freeman H. Owens
BY
Cavanagh Jones
ATTORNEYS

Patented Mar. 29, 1932                                      1,851,724

UNITED STATES PATENT OFFICE

FREEMAN H. OWENS, OF NEW YORK, N. Y.

COMBINED FRAMING AND DISSOLVING MECHANISM

Application filed October 18, 1928. Serial No. 313,309.

This invention relates to motion picture apparatus, and has special reference to improvements in a combined motion picture projector and camera system, and particularly of the portable type.

The principal object of my present invention centers about the provision of a combined camera and projector apparatus embodying a common or unitary means for framing the film when the apparatus is used as a projector and for shuttering the film when the apparatus is used as a camera.

More specifically, the objects of the invention include the provision of a projector framing device and camera dissolving device having means common to both operable by a single manipulable member and adapted for moving the framing device during projector use of the apparatus and for operating the dissolving device during camera use of the apparatus; the further provision of the combined framing and dissolving mechanism of this nature constructed and designed to occupy very small space or confines in the casing of the combined projector and camera, and made with a minimum of operating parts associated for simple operation and for the same manipulation by the operator when the apparatus is used as a camera or projector; the still further provision of a combined framing and dissolving mechanism composed of parts which may be readily assembled and disassembled for use and repair.

Figure 1:
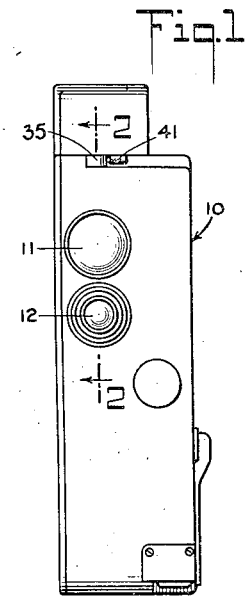
Figure 2:
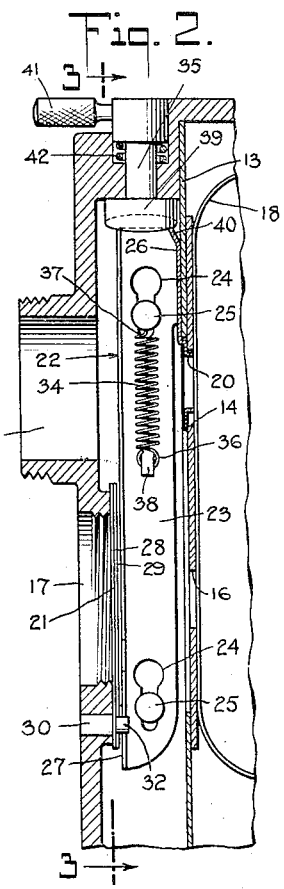
Figure 3:
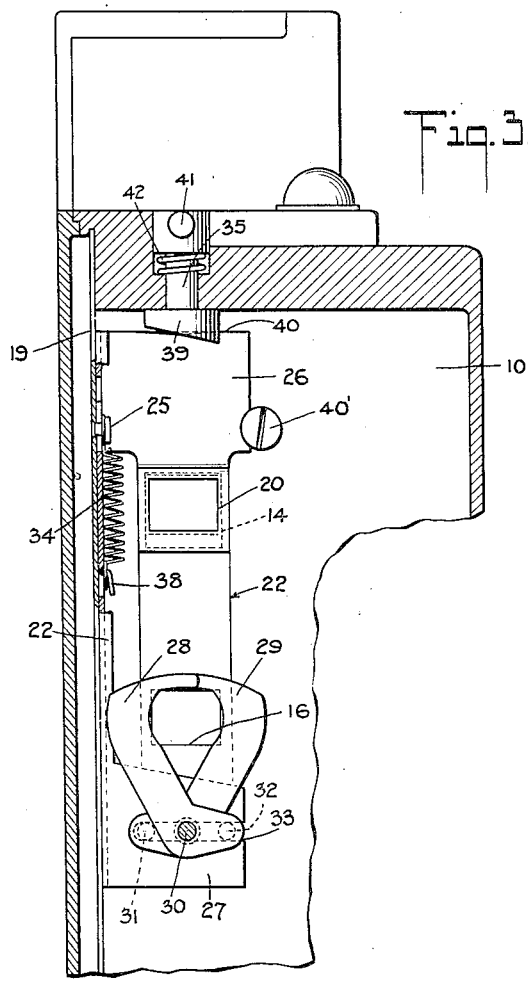
Figure 4:
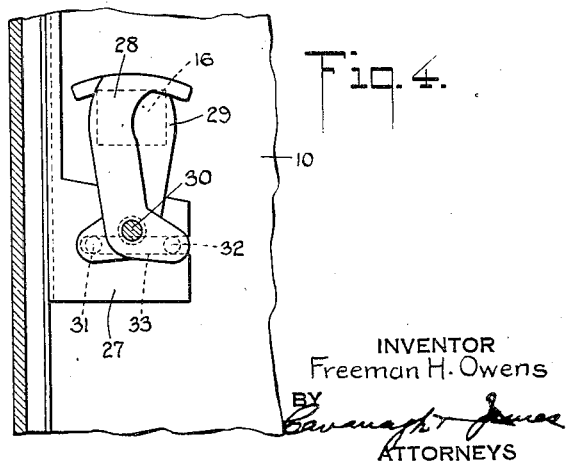

To the accomplishment of the foregoing and such other objects as will hereinafter appear, my invention consists in the elements and their relation one to the other as hereinafter more particularly described and sought to be defined in the claims; reference being had to the accompanying drawings which show the preferred form of my invention, and in which:

Fig. 1 is a front elevational view of the combined camera and projector to which my invention is applied, Fig. 2 is a view taken in cross-section on an enlarged scale in the plane of the line 2—2, Fig. 1 and showing the combined framing and shuttering mechanism of the invention, Fig. 3 is a view thereof taken in cross-section in the plane of the line 3—3, Fig. 2 and showing the framing and shuttering devices in one position of operation, and Fig. 4 is a fragmentary view similar to Fig. 3 showing the shuttering device in a different position of operation.

Referring now more in detail to the drawings, my invention is shown applied to a combined camera and projector of the type described and claimed in my copending application Serial No. 267,157 to projection machine, filed April 4, 1928, embodying a casing generally designated as 10 which houses all of the operating elements for the camera and projector, the said casing being provided with spaced projector and camera lens systems 11 and 12 respectively and with an interior wall or partition 13 having a projector window 14 in alignment with the lens opening 15 of the projection lens system, and a camera window 16 in alignment with the camera lens opening 17 of the camera lens system, these windows 14 and 16 being preferably arranged in vertical alignment for cooperation with a projecting or taking film 18 which is movable over or past said windows. The camera casing is further provided with another interior wall or partition 19.

The combined framing and shuttering mechanism of my present invention comprises generically a framing device 20 movable over the projector window for framing the film images thereat and a shuttering device such as a dissolving device 21 associated with the camera lens opening 17 and the camera window 16 and a means generally designated as 22 common to both the framing device 20 and the dissolving device 21 and capable of operating the framing device during projector use of the apparatus and for operating the dissolving device during camera use of the apparatus.

In the preferred form of the invention, the operated or movable part of the common means 22 is made in the form of a slide member detachably attachable to the interior wall 19 of the camera projector casing 10, which slide member has formed integrally therewith the framing device 20. This slide member 22 comprises a slide portion 23 having spaced key-shaped openings 24, 24 which are receivable by headed studs 25, 25 fixed to the wall 19 in a manner to permit quick removability of the slide member from its mounting on this wall 19. The slide member is also provided at the top with an integral section 26 arranged at right angles thereto and at the bottom with another integral section 27 also arranged at right angles thereto, the section 26 having formed integrally therewith the framing device 20.

The shuttering means or dissolving device may comprise the two lever blades 28 and 29 hinged together on the stud 30 which may be journalled in the front wall of the casing 10, the lower arms of these blades being provided with the pins 31 and 32 which seat and slide in a slot 33 formed in section 27 of the slide member, the section 27 thus defining the operating means for the dissolving device. By means of this construction it will be seen that when the slide member 22 is moved downwardly, the section 27 will operate upon the dissolving blades 28 and 29 to move the same to closed dissolving position, as shown in Fig. 4 of the drawings, and that when the slide member 22 is moved upwardly, the section 27 thereof will operate upon the dissolving blades 28 and 29 to move the same to open position, as shown in Fig. 3 of the drawings. It will be further seen that movement of this slide member 22 in its opposite directions will move the framing device 20 in the projector window 14. To assist in guiding the movement of the slidable member 22, I prefer to provide a guide screw 40' cooperating with a side edge of the side section 26.

For moving or operating the slide member 22 in its opposite directions, I prefer to provide a spring member 34 associated with a manually manipulable cam member 35. The spring member 34 is anchored at its opposite ends 36 and 37 respectively to a struck-out hook 38 formed on the slide member 22 and one of the headed studs 25, this method of attachment being preferred to permit quick attachability and removability of the slide member. The manually manipulable member 35 comprises a cam element 39 which is adapted to operate upon the top edge 40 of the section 26, to the shaft of which cam member is attached the finger operated arm 41, a spring 42 being provided housed by a cavity of the casing for holding the cam and arm in its various operated positions. With this recited construction, it will be evident that manipulation of the arm 41 from the position shown in Fig. 1 to those shown in Figs. 2 and 3 releases the slide member 22 so that the same is influenced by the spring 34 to elevate the slide member, and that return manipulation of the arm 41 from the positions shown in Figs. 2 and 3 to that shown in Fig. 1 of the drawings causes the engagement between the cam member 39 and the top edge 40 of the slide section 26, and the consequent descending movement of the slide member 22.

The use and operation of the combined framing and shuttering mechanism of my present invention will in the main be fully apparent from the above detailed description thereof. It will be further apparent that control or manipulation of a single operated member 41 will serve for framing the film during projector use and for shuttering the film as by dissolving the same during camera use, and that these functions are accomplished, moreover, with the use of a slide member common to both the framing and dissolving devices. It will be further seen that the slide member 22 may be readily attachable to and detachable from the camera casing and that the combined framing and dissolving mechanism is made of a minimum of parts assembled for both ease and simple operation. It will be further apparent that while I have shown and described my invention in its preferred form, many changes and modifications may be made in the structure disclosed, without departing from the spirit of the invention, defined in the following claims.

What I claim is:

1. In a combined camera and projector apparatus, a framing device associated with the projector, a shuttering device associated with the camera, and a single manually movable means common to both the framing device and the shuttering device and operatively connected with the framing device and the shuttering device, said means being movable for operating the framing device and the shuttering device when the apparatus is used either as a projector or as a camera.

2. In a combined camera and projector apparatus, spaced projector and camera lens systems, a framing device associated with the projector lens system, a dissolving device associated with the camera lens system, and a single manually movable means common to both the framing device and the dissolving device and operatively connected with the framing device and the dissolving device, said means being movable for operating the framing device and the dissolving device when the apparatus is used either as a projector or as a camera.

3. In a combined camera and projector apparatus, a casing, spaced projector and camera windows, a framing device for the projector window and a shuttering device for the camera window, movable means in the casing operatively connected with the framing device and the shuttering device actuatable for simultaneously operating the framing device and the shuttering device when the apparatus is used either as a projector or as a camera, and a single manually manipulable member operatively connected with said movable means for actuating the same.

4. In a combined motion picture camera and projector apparatus, a casing, spaced projector and camera windows past which motion picture film is movable, a framing device for the projector window and a dissolving device for the camera window, movable means in the casing common to the framing device and dissolving device actuatable for operating the framing device when the apparatus is used as a projector and the dissolving device when the apparatus is used as a camera, and a member having a manually manipulable part arranged externally of said casing operatively connected with said movable means for actuating the same.

5. In a combined camera and projector apparatus, a casing, spaced projector and camera windows in said casing, a framing device for the projector window and a shuttering device mounted on said casing in alinement with the camera window, a slide member in the casing common to the framing device and shuttering device actuatable for moving the framing device when the apparatus is used as a projector and for operating the shuttering device when the apparatus is used as a camera, and a manually manipulable member operatively connected with said slide member for actuating the same.

6. In a combined camera and projector apparatus, a framing device associated with the projector, a shuttering device associated with the camera, a slide member common to the framing device and shuttering device actuatable for moving the framing device when the apparatus is used as a projector and for operating the shuttering device when the apparatus is used as a camera, means resiliently urging said slide member in one direction, and a manually operable cam member for actuating the slide member in opposition to said resilient means.

7. In a combined motion picture apparatus, a casing, spaced projector and camera windows in said casing, and a combined framing and shuttering device for the projector and camera windows including a slide member detachably attachable to and slidable in a wall of said casing, a framing element integral with said slide member, a shuttering device mounted on a wall of said casing and connected to said slide member to be operated thereby, a cam element operatively connected with said slide member for moving the same and a manually manipulable member arranged externally of said casing attached to said cam member.

8. In a combined motion picture apparatus, a casing, spaced projector and camera windows in said casing, and a combined framing and dissolving device for the projector and camera windows including a spring controlled slide member detachably attachable to and slidable in a wall of said casing, a framing element integral with said slide member, a dissolving device connected to said slide member to be operated thereby, a cam element mounted in said casing and operating on an edge of said slide member for moving the same and a manually manipulable member arranged externally of said casing attached to said cam member.

9. In a combined motion picture apparatus, a casing, vertically spaced projector and camera windows in said casing, and a combined framing and shuttering device for the projector and camera windows including a slide member detachably attachable to and slidable in a wall of said casing, a framing element integral with and arranged at right angles to said slide member, a shuttering device mounted on a wall of said casing and connected to said slide member to be operated thereby, a cam element mounted in said casing and operating on the top edge of said slide member for moving the same and a manually manipulable member arranged externally of said casing attached to said cam member.

Signed at New York, in the county of New York and State of New York, this 3rd day of October, A. D. 1928.

FREEMAN H. OWENS.